(12) United States Patent
Puusaari et al.

(10) Patent No.: US 11,601,410 B2
(45) Date of Patent: Mar. 7, 2023

(54) METHOD AND APPARATUS FOR THE ACTIVATION OF SERVICES

(71) Applicant: Nokia Technologies Oy, Espoo (FI)

(72) Inventors: Kristian Puusaari, Bristol (GB); Jonathan Davies, Bristol (GB); Craig Pugsley, Devon (GB); Timo T. Nieminen, Tampere (FI); Aki Tamminen, Tampere (FI); Samuli Ylinen, Tampere (FI); Jyrki Hokkanen, Toijala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/719,176

(22) Filed: Dec. 18, 2019

(65) Prior Publication Data

US 2020/0205109 A1 Jun. 25, 2020

Related U.S. Application Data

(63) Continuation of application No. 16/160,826, filed on Oct. 15, 2018, now Pat. No. 10,568,058, which is a
(Continued)

(51) Int. Cl.
*H04L 9/40* (2022.01)
*H04W 4/60* (2018.01)
(Continued)

(52) U.S. Cl.
CPC .......... *H04L 63/08* (2013.01); *H04L 63/0876* (2013.01); *H04W 4/16* (2013.01);
(Continued)

(58) Field of Classification Search
CPC ... H04L 63/08; H04L 63/0876; H04L 67/303; H04W 12/068; H04W 12/084;
(Continued)

(56) References Cited

U.S. PATENT DOCUMENTS

| 6,081,731 A | 6/2000 | Boltz et al. |
| 6,411,806 B1 | 6/2002 | Garner et al. |

(Continued)

FOREIGN PATENT DOCUMENTS

| EP | 1 051 054 A2 | 11/2000 |
| EP | 1650999 A1 | 4/2006 |

(Continued)

OTHER PUBLICATIONS

Ren, Kui, et al. "Securing emerging short range wireless communications: the state of the art." IEEE Wireless Communications 21.6 (2014): 153-159. (Year: 2014).*
(Continued)

*Primary Examiner* — Sharad Rampuria
(74) *Attorney, Agent, or Firm* — Ditthavong, Steiner & Mlotkowski

(57) ABSTRACT

An approach is provided for presenting an activation indicator to a user. A connection with a mobile device is detected. Retrieval is caused, at least in part, of a unique hardware identifier associated with the mobile device. It is determined that the mobile device is eligible for a service based on the unique hardware identifier. Presentation is caused, at least in part, of a visual indicator of the eligibility for the service based on the determination.

20 Claims, 13 Drawing Sheets

US 11,601,410 B2
Page 2

Related U.S. Application Data continuation of application No. 15/690,007, filed on Aug. 29, 2017, now Pat. No. 10,104,632, which is a continuation of application No. 15/425,640, filed on Feb. 6, 2017, now Pat. No. 9,749,979, which is a continuation of application No. 15/014,661, filed on Feb. 3, 2016, now Pat. No. 9,565,549, which is a continuation of application No. 14/329,813, filed on Jul. 11, 2014, now Pat. No. 9,288,660, which is a continuation of application No. 12/618,753, filed on Nov. 15, 2009, now Pat. No. 8,811,942.

(51) Int. Cl.
| | |
|---|---|
| H04W 12/06 | (2021.01) |
| H04W 12/08 | (2021.01) |
| H04W 12/084 | (2021.01) |
| H04W 4/16 | (2009.01) |
| H04W 8/18 | (2009.01) |
| H04W 60/00 | (2009.01) |
| H04L 67/303 | (2022.01) |
| G06F 3/0481 | (2022.01) |

(52) U.S. Cl.
CPC ............... *H04W 4/60* (2018.02); *H04W 8/18* (2013.01); *H04W 12/06* (2013.01); *H04W 12/068* (2021.01); *H04W 12/08* (2013.01); *H04W 12/084* (2021.01); *H04W 60/00* (2013.01); *G06F 3/0481* (2013.01); *H04L 67/303* (2013.01)

(58) Field of Classification Search
CPC ....... H04W 12/06; H04W 12/08; H04W 4/60; H04W 60/00; H04W 4/16; H04W 8/18; H04W 4/20; H04W 8/04; H04W 8/26; H04W 12/062; H04W 12/065; H04W 12/069; H04W 60/04; G06F 3/0481
See application file for complete search history.

(56) References Cited

U.S. PATENT DOCUMENTS

| | | | |
|---|---|---|---|
| 6,469,998 | B1 | 10/2002 | Burgaleta Salinas et al. |
| 6,859,649 | B1 | 2/2005 | Denenberg et al. |
| 6,993,131 | B1 | 1/2006 | Meyers |
| 7,089,003 | B2 | 8/2006 | Fingerhut et al. |
| 7,177,837 | B2 | 2/2007 | Pegaz-Paquet et al. |
| 7,366,512 | B1 | 4/2008 | Kefalas et al. |
| 7,433,710 | B2 | 10/2008 | Bodnar et al. |
| 7,509,116 | B2 | 3/2009 | Fan et al. |
| 7,660,871 | B2 | 2/2010 | Koh et al. |
| 7,706,774 | B1 | 4/2010 | Lee et al. |
| 7,715,824 | B2 | 5/2010 | Zhou et al. |
| 7,986,782 | B2 | 7/2011 | Meyers |
| 8,046,581 | B2 | 10/2011 | Netanel |
| 8,139,564 | B1 | 3/2012 | Weaver |
| 8,213,898 | B2 | 7/2012 | Choti et al. |
| 8,340,635 | B2 | 12/2012 | Herz et al. |
| 8,391,832 | B2 | 3/2013 | Gonzalez et al. |
| 8,798,612 | B2 | 8/2014 | Satake et al. |
| 8,918,080 | B2 | 12/2014 | Neal et al. |
| 9,288,660 | B2 * | 3/2016 | Puusaari ............. H04W 12/084 |
| 10,037,516 | B2 | 7/2018 | Mardikar |
| 2003/0013434 | A1 | 1/2003 | Rosenberg et al. |
| 2005/0064862 | A1 | 3/2005 | Castrogiovanni et al. |
| 2005/0075895 | A1 | 4/2005 | Mohsenin et al. |
| 2006/0015580 | A1 | 1/2006 | Gabriel et al. |
| 2006/0223584 | A1 | 10/2006 | Sharma |
| 2006/0293036 | A1 | 12/2006 | Zhou |
| 2007/0197261 | A1 | 8/2007 | Humbel |
| 2007/0232272 | A1 | 10/2007 | Gonsalves et al. |
| 2008/0214215 | A1 | 9/2008 | Aaltonen et al. |
| 2008/0250443 | A1 | 10/2008 | Fan et al. |
| 2008/0318550 | A1 | 12/2008 | Deatley |
| 2009/0037207 | A1 | 2/2009 | Farah |
| 2009/0061839 | A1 | 3/2009 | Zimmerman et al. |
| 2009/0286509 | A1 | 11/2009 | Huber et al. |
| 2010/0030734 | A1 | 2/2010 | Chunilal |
| 2011/0065384 | A1 * | 3/2011 | Cader ..................... H04L 67/14 455/41.1 |
| 2011/0066479 | A1 | 3/2011 | Benson |
| 2011/0098030 | A1 * | 4/2011 | Luoma .................... H04W 4/50 455/435.1 |
| 2011/0119122 | A1 * | 5/2011 | Padam ................... G06Q 30/02 705/26.1 |
| 2013/0167196 | A1 * | 6/2013 | Spencer ................. H04W 8/18 370/254 |
| 2014/0156373 | A1 | 6/2014 | Roberts et al. |
| 2014/0335823 | A1 | 11/2014 | Heredia et al. |
| 2016/0050553 | A1 * | 2/2016 | Kang ..................... G06F 21/41 455/41.2 |
| 2019/0132400 | A1 | 5/2019 | Platt |

FOREIGN PATENT DOCUMENTS

| | | | |
|---|---|---|---|
| EP | 2079256 | A1 | 7/2009 |
| WO | 2008148191 | A2 | 12/2008 |
| WO | 2008154726 | A1 | 12/2008 |

OTHER PUBLICATIONS

Zhou, Xinyu, et al. "A robust radio-frequency fingerprint extraction scheme for practical device recognition." IEEE Internet of Things Journal 8.14 (2021): (Year: 2021).*

Kenney, John B. "Dedicated short-range communications (DSRC) standards in the United States." Proceedings of the IEEE 99.7 (2011): 1162-1182. (Year: 2011).*

Office Action for related European Patent Application No. 10829575.9-1218 dated Feb. 19, 2021, 5 Pages.

Office Action for related European Patent Application No. 10829575.9-1218, dated Oct. 28, 2020, 5 pages.

Office Action for corresponding European Patent Application No. 10 829 575.9-1218, dated Apr. 17, 2020, 5 pages.

Office Action for corresponding Chinese Patent Application No. 201080051569.0, dated Feb. 17, 2014, English Language Summary Included, 11 pages.

International search report and written opinion for corresponding international application No. PCT/FI2010/050905 dated Mar. 4, 2011, pp. 1-11.

Chinese Office Action for corresponding Chinese Application No. 201080051569.0 dated Sep. 21, 2015, with English language summary, 4 Pages.

Chinese Office Action for corresponding Chinese Application No. 201080051569.0 dated May 15, 2015, with English language summary, 5 Pages.

Chinese Office Action for corresponding Chinese Application No. 201080051569.0 dated Nov. 4, 2014, with English language summary, 12 Pages.

Office Action for related European Patent Application No. 10829575.9-1870, dated Feb. 27, 2017, 8 pages.

Office Action for related European Patent Application No. 10829575.9-1218, dated Oct. 2, 2018, 5 pages.

Office Action for related European Patent Application No. 10829575.9-1218, dated Apr. 23, 2019, 6 pages.

Office Action for related European Patent Application No. 10829575.9-1218, dated Oct. 18, 2019, 6 pages.

* cited by examiner

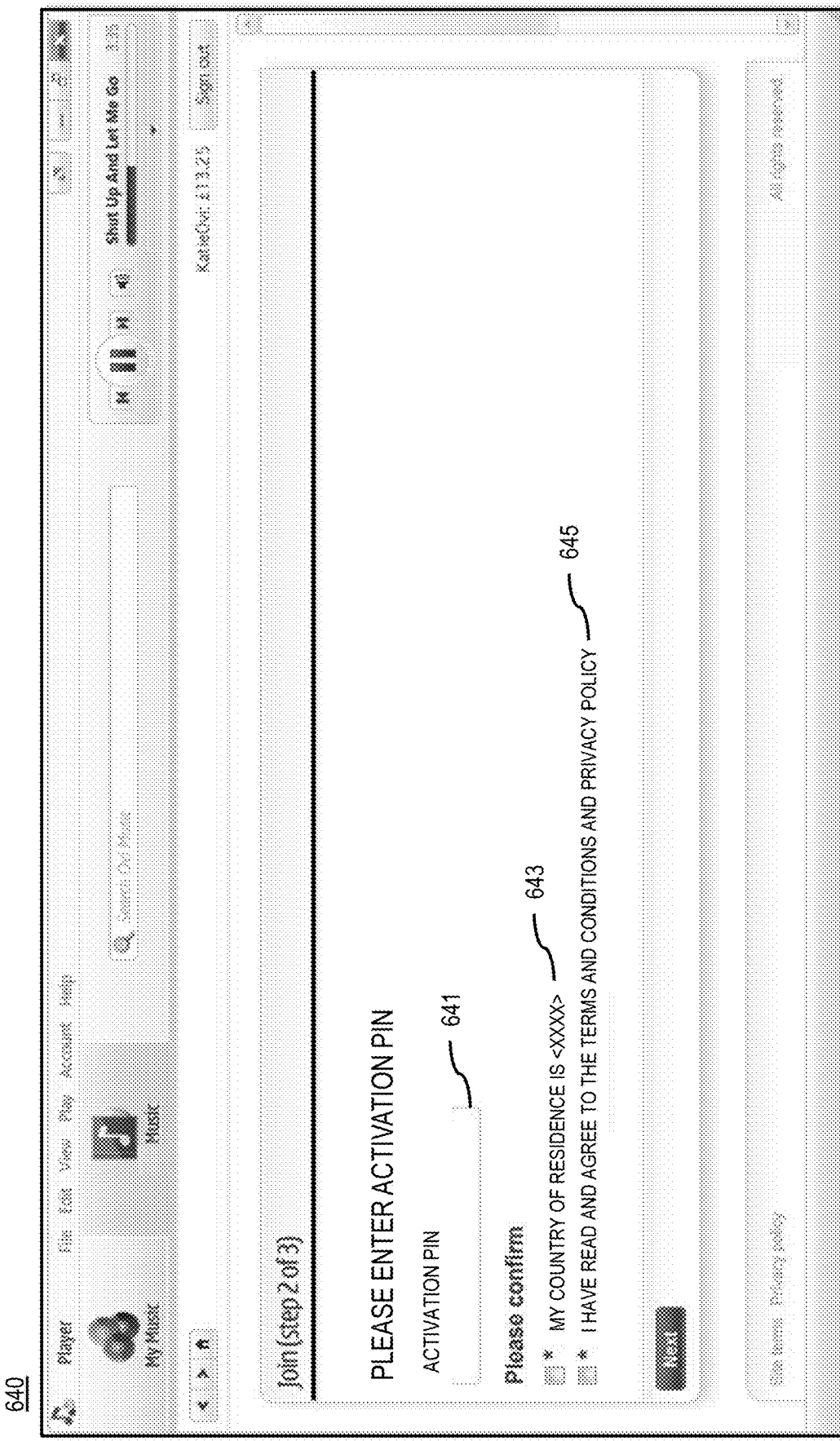

680

METHOD AND APPARATUS FOR THE ACTIVATION OF SERVICES

RELATED APPLICATION

This application is a continuation of U.S. patent application Ser. No. 16/160,826, filed Oct. 15, 2018, entitled "Method and Apparatus for the Activation of Services", which is a continuation of U.S. patent application Ser. No. 15/690,007 (now U.S. Pat. No. 10,104,632), filed Aug. 29, 2017, entitled "Method and Apparatus for the Activation of Services," which is a continuation of U.S. patent application Ser. No. 15/425,640 (now U.S. Pat. No. 9,749,979), filed Feb. 6, 2017, entitled "Method and Apparatus for the Activation of Services," which is a continuation of U.S. patent application Ser. No. 15/014,661 (now U.S. Pat. No. 9,565,549), filed Feb. 3, 2016, entitled "Method and Apparatus for the Activation of Services," which is a continuation of U.S. patent application Ser. No. 14/329,813 (now U.S. Pat. No. 9,288,660), filed Jul. 11, 2014, entitled "Method and Apparatus for the Activation of Services," which is a continuation of U.S. patent application Ser. No. 12/618,753 (now U.S. Pat. No. 8,811,942), filed Nov. 15, 2009, entitled "Method and Apparatus for the Activation of Services," which are incorporated herein by reference in their entireties.

BACKGROUND

Service providers (e.g., wireless, cellular, etc.) and device manufacturers are continually challenged to deliver value and convenience to consumers by, for example, providing compelling network services. However, in many cases, these services have traditionally required users to proactively take steps for initiating processes to activate or register with the services before using or receiving access to the respective service. That is, the user must first recognize a need to initiate activation of the service and then take the time to perform the activation or registration steps associated with the service. Many users may not know of the activation processes or if the users know of the activation process, may not complete the activation process because the activation scheme is complex or confusing.

Some Example Embodiments

Therefore, there is a need for an approach for presenting an activation indicator to a user based on user eligibility for a service.

According to one embodiment, a method comprises detecting a connection with a mobile device. The method also comprises causing, at least in part, retrieval of a unique hardware identifier associated with the mobile device. The method further comprises determining that the mobile device is eligible for a service based on the unique hardware identifier. The method additionally comprises initiating presentation of a visual indicator of the eligibility for the service based on the determination.

According to another embodiment, an apparatus comprising at least one processor, and at least one memory including computer program code, the at least one memory and the computer program code configured to, with the at least one processor, cause, at least in part, the apparatus to detect a connection with a mobile device. The apparatus is also caused to cause, at least in part, retrieval of a unique hardware identifier associated with the mobile device. The apparatus is further caused to determine that the mobile device is eligible for a service based on the unique hardware identifier. The apparatus is additionally caused to initiate presentation of a visual indicator of the eligibility for the service based on the determination.

According to another embodiment, a computer-readable storage medium carrying one or more sequences of one or more instructions which, when executed by one or more processors, cause, at least in part, an apparatus to detect a connection with a mobile device. The apparatus is also caused to cause, at least in part, retrieval of a unique hardware identifier associated with the mobile device. The apparatus is further caused to determine that the mobile device is eligible for a service based on the unique hardware identifier. The apparatus is additionally caused to initiate presentation of a visual indicator of the eligibility for the service based on the determination.

According to another embodiment, an apparatus comprises means for detecting a connection with a mobile device. The apparatus also comprises means for causing, at least in part, retrieval of a unique hardware identifier associated with the mobile device. The apparatus further comprises means for determining that the mobile device is eligible for a service based on the unique hardware identifier. The apparatus additionally comprises means for initiating presentation of a visual indicator of the eligibility for the service based on the determination.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6E are diagrams of user interfaces utilized in the processes of FIG. 4, according to various embodiments;

DESCRIPTION OF SOME EMBODIMENTS

Examples of a method, apparatus, and computer program for presenting activation information based on a determination of eligibility for a service are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
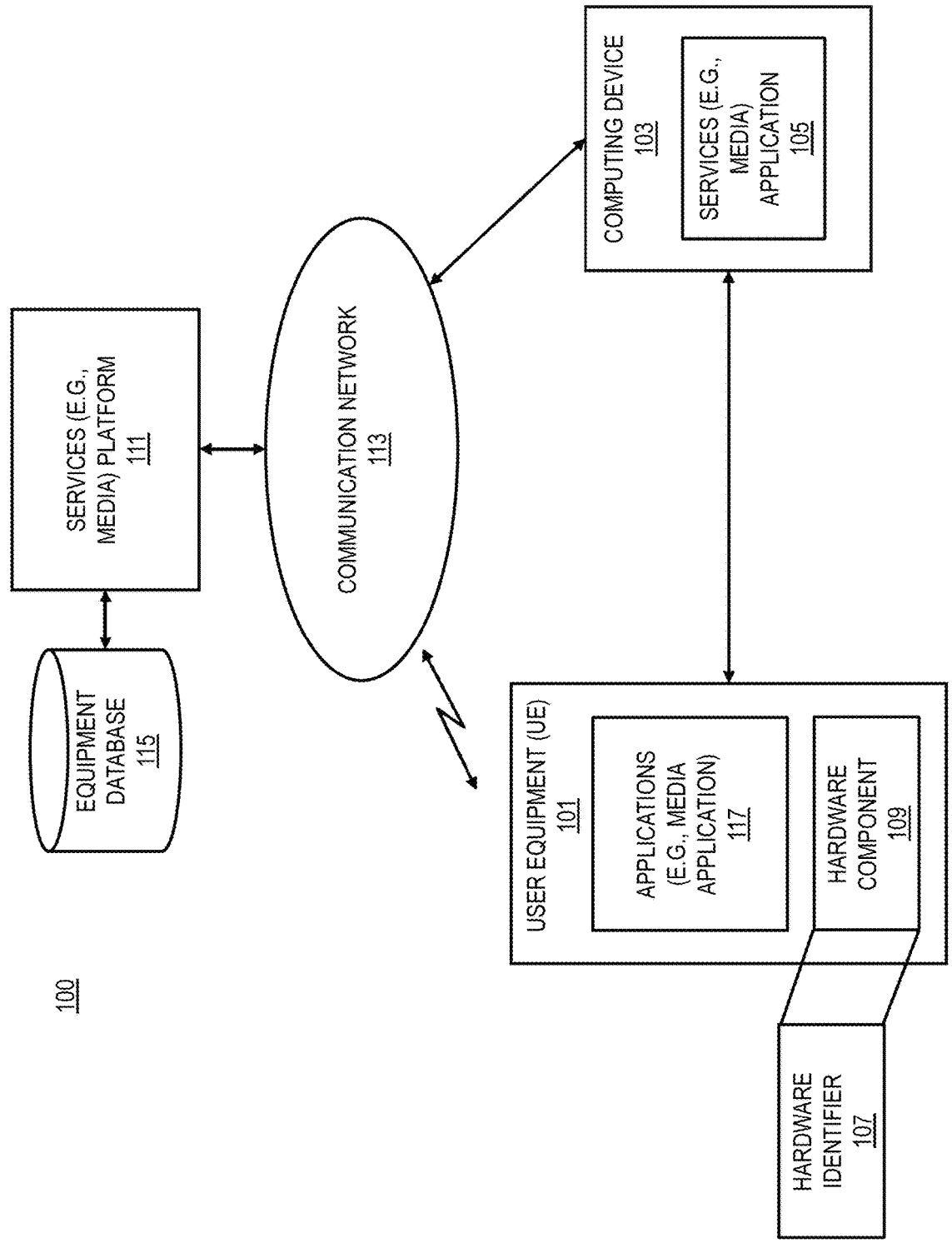
FIG. 1 is a diagram of a system capable of causing presentation of an indicator that a device is eligible for a service, according to one embodiment.

FIG. 1 is a diagram of a system capable of causing presentation of an indicator, such as a command prompt and/or a dialogue screen, that a device is eligible for a service, according to one embodiment. Network services, such as media services (e.g., music services, video services, photo services, etc.), navigation services, gaming services and the like are increasingly being offered to users who can engage in these services using their user equipment (e.g., mobile handsets, computers, etc.). Although various embodiments are described with respect to media services, it is contemplated that the approach described herein may be used with any other services available over a communication network. Licenses or authorization to use these services may be purchased or packaged with respective user equipment. However, some of these services still require activation and/or registration before a user is able utilize the respective service. This activation process may be unknown or inconvenient to the user to initiate and thus the user may lack incentive to activate the service. It is noted that service providers may have invested heavily in the development of such services; the return on this investment can be undermined if users are reluctant to even try the service because of an inconspicuous activation procedure.

To address this problem, a system 100 of FIG. 1 introduces the capability to present an indicator that a device is eligible for a service after activation. According to some embodiments, users are provided an indicator and a prompt to activate or register for a service based on whether a user equipment (UE) 101 connected to a computing device 103 is eligible for the service. The computing device 103, via a services (e.g., media) application 105 may detect that the UE 101 is connected and retrieve a unique identifier, such as a unique hardware identifier 107 associated with a hardware component 109 of the UE 101, or and/or user information stored in the UE 101. The computing device 103 may then formulate a request for more information about the UE 101 based on the unique identifier, such as the unique hardware identifier 107, to a services platform 111 (e.g., a media services platform, a music services platform, a gaming platform, navigation services platform, etc.). The request may be sent via a communication network 113. Then, the services platform 111 may query an equipment database 115 to determine status information about the UE 101 based on the unique identifier. The status information may include whether the UE 101 is compatible with the service, whether the UE 101 or the user has been activated to work with the service, etc. When the services platform 111 retrieves the status information, the services platform 111 may transmit the status information to the computing device 103, which may utilize the services application 105 to process the status information. Moreover, the services application 105 may then present an indicator to the user to activate the service for the UE 101 based on the status information. Once activation is complete, the user may utilize the service on via the services application 105 on the computing device 103 or other applications 117 associated with the service on the UE 101.

According to certain embodiments, services application 105 may be active on the computing device 103 when the UE 101 is connected. The services application 105 may be an application specific to a single service and/or service provider or encompass many services (e.g., music services, e-mail services, shopping services, etc.). By way of example, the one or more of the services may be activated based on an association with the UE 101 (e.g., the UE 101 is packaged with access to the service). The UE 101 may be connected to the computing device 103 via one of more of many different interfaces such as a wired interfaces (e.g., universal serial bus (USB), serial port, parallel port, the Institute of Electrical and Electronics Engineers (IEEE) 1394 interface), and wireless interfaces (e.g., via a wireless local area network connection (WLAN), BLUETOOTH, etc.). The services application 105 may monitor the computing device 103 to determine when a connection is established.

Then, a device and/or a user association between the UE 101 and the services application 105 may occur, where the services application 105 may retrieve one or more identifiers (e.g., the unique hardware identifier 107 and/or user information) from the UE 101. In certain embodiments, the services application 105 retrieves the one or more identifiers, such as the hardware identifier(s) 107, by requesting that an application 117 or operating system of the UE 101 retrieve the one or more identifiers. The UE 101 may include one or more hardware identifiers 107 for uniquely identifying the UE 101, and/or user information for uniquely identifying the user of the UE 101. The one or more identifiers, such as the hardware identifiers 107, may be identification data that can be stored in memory of the UE 101 or can be a serial number or other unique identifier that can be obtained from a hardware component 109 of the UE 101. Such a hardware identifier 107 can include user accessible identifiers such as an International Mobile Equipment Identity (IMEI), an electronic serial number, Mobile Equipment Identity (MEID), user inaccessible identifiers such as a serial number of a component (e.g., a processor, transceiver, etc.) associated with the UE 101 or another identifier known to the manufacturer of the UE 101, or other identifiers unique to a particular UE 101. Moreover, in certain embodiments, the one or more identifiers may be a removable hardware identifier located on a removable memory device such as a subscriber identity module (SIM) or on a removable component attached to the UE 101 (e.g., a BLUETOOTH headset or a hands free communication device) that the UE 101 may extract the one or more identifiers from.

The services application 105 can retrieve and transmit one or more identifiers 107 to the services platform 111 via the communication network 113 as part of the activation notification procedure. The services application 105 may be configured to access to the services platform 111 using an identifier of the services platform 111 (e.g., web site address, telephone number, etc.) to request a service status of the UE 101. The services platform 111 may query the equipment database 115 and/or user database to determine if the service status of the UE 101 and/or the user.

The equipment database 115 and the user database may be used by the services platform 111 to assist with managing user accounts and services. Moreover, the services platform 111 can utilize the equipment database 115 and the user database to store relevant information about the UE 101 and/or the user. In certain embodiments, the equipment database 115 may include or be replaced with a license provisioning gateway that stores the relevant UE information. In one embodiment, the relevant UE information can include hardware identifiers 107 that can be associated with other information about a corresponding UE 101. By way of example, the UE information may be stored as a table with fields for one or more hardware identifiers as well as the information associated with the hardware identifiers. The other information corresponding to the hardware identifiers 107 and/or user can include licensing information that provides the type of service access and time period of access the UE 101 is entitled to (e.g., because the service was packaged with the cost of the UE 101). Also, some of the licensing information may be based on other characteristics of the UE 101 such as the country location of the UE 101. This may be important because many countries have different copyright, trademark, and other licensing laws and the UE 101 used in one country may have different rights than a UE 101 used in another country. Further, the service provider and user may have access to different content in different countries based on contracts made by the service provider with other entities. Additionally, the equipment database 115 may store a "blacklist" status of UEs 101. A UE 101 may be marked as blacklisted if the UE 101 is not permitted access to the service for one or more reasons, e.g., country restrictions. Additionally, the UE 101 information may include information as to whether the UE 101 is compatible with the service, whether an account has been activated and/or is associated with the UE 101, whether the UE 101 has a license to utilize the service, a combination thereof, etc. Once the service status is determined by the services platform 111, the services platform 111 may cause, at least in part, transmission of the information to the computing device 103.

Once the service status is received from the services platform 111, the services application 105 may determine if the UE 101 and/or the user is eligible for the service. If the UE 101 and/or user is eligible for the service, the user is prompted to activate the service using an activation or registration wizard as further detailed in FIGS. 6A-6E. In certain scenarios, during the activation or registration process, the computing device 103 may query the UE 101 for any available user information, e.g. the services application 105 related information, account information, user identifier and password information, personal identification number (PIN) number, service identification number, user contact information, email address, phone number, social network service information, etc. that may be stored in a memory of the UE 101. If available, the UE application 117 or the operating system of the UE 101 may retrieve this information to transmit it to the computing device 103. This user information may be utilized to assist the user in completing the registration by filling out empty user information fields during registration. In certain scenarios, the user information and/or the services application 105 information may be associated with a service of the services platform 111 or another services platform. Upon successful activation, the user may utilize the computing device 103 and/or the UE 101 to access the service. In certain embodiments, the service is a media service and use of the service includes downloading licensed music or video to the UE 101 or computing device 103.

As shown in FIG. 1, the user equipment (UE) 101 has connectivity to the computing device 103 and the services platform 111 via the communication network 113. By way of example, the communication network 113 of system 100 includes one or more networks such as a data network (not shown), a wireless network (not shown), a telephony network (not shown), internet protocol (IP) datacast network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. In addition, the wireless network may be a short range wireless network, e.g. wireless LAN network, Bluetooth network®, Ultra-Wide Band (UWB) network, and the like.

The UE 101 is any type of mobile terminal, fixed terminal, or portable terminal including a mobile handset, station, unit, device, multimedia computer, multimedia tablet, Internet node, communicator, communication device, desktop computer, laptop computer, Personal Digital Assistants (PDAs), audio/video player, digital camera/camcorder, game device, positioning device, television broadcast receiver, radio broadcast receiver, or any combination thereof. It is also contemplated that the UE 101 can support any type of interface to the user (such as "wearable" circuitry, etc.).

By way of example, the UE 101, computing device 103, and services platform 111 communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the UE application 117, the services application 105, and services platform 111 may interact according to a client-server model. According to the client-server model, a client process sends a message including a request to a server process, and the server process responds by providing a service (e.g., streaming music). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
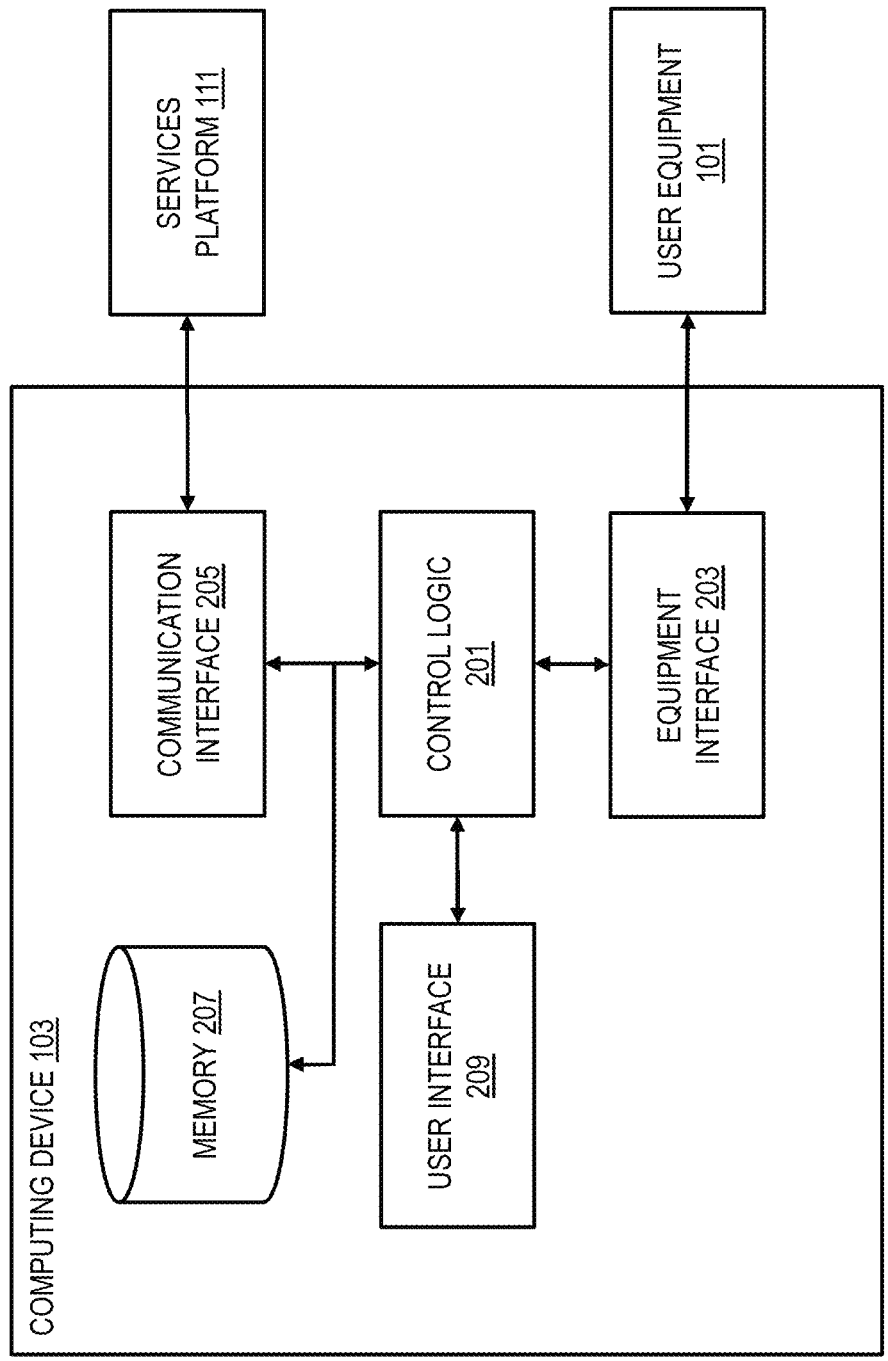
FIG. 2 is a diagram of the components of a computing device utilized to present an indicator that a user equipment is eligible for a service, according to one embodiment.

FIG. 2 is a diagram of the components of a computing device utilized to present an indicator that a user equipment is eligible for a service, according to one embodiment. By way of example, the computing device 103 includes one or more components for providing an activation notification to a user based on a hardware identifier 107 of a connected UE 101. It is contemplated that the functions of these components may be combined in one or more components or performed by other components of equivalent functionality. In this embodiment, the computing device 103 includes at least one control logic 201, an equipment interface 203 to communicate with devices, at least one communication interface 205 to communicate with a services platform 111, at least one memory 207 with computer program instructions, and a user interface 209. Moreover, in certain embodiments, the computing device 103 may be a UE 101.

According to certain embodiments, services application 105 may execute on the control logic 201 with the computer program instructions. The services application 105 may utilize the control logic 201 to monitor the equipment interface 203 to detect if a UE 101 is connected. As noted above, the equipment interface 203 may include wired interfaces (e.g., USB, serial port, parallel port, the IEEE 1394 interface, etc.), wireless interfaces (e.g., via WLAN, BLUETOOTH, etc.), or the like. When the UE 101 is connected, the equipment interface 203 may send a signal (e.g., an interrupt) to the control logic 201 notifying the control logic 201 and the services application 105 of the UE 101 connection. Alternatively or additionally, the control logic 201 may monitor the equipment interface 203 periodically to determine whether a UE 101 is connected. Moreover, the services application 105 may request and receive one or more hardware identifiers from the UE 101 to identify the UE 101 via the equipment interface 203. A UE application 117 or an operating system of the UE 101 may determine the hardware identifier 107 and transmit the identifier to the computing device 103.

Once the services application 105 receives the hardware identifier 107, the services application 105 may utilize the communication interface 205 to retrieve information about the UE 101 from a services platform 111 using the hardware identifier 107. The services application 105 may generate a query specifying the hardware identifier 107 and a request for a service status of the UE 101 associated with the hardware identifier 107. The query is then transmitted to the services platform 111 via the communication interface 205. Next, the services application 105 may receive a response to the query specifying the service status of the UE 101. In certain embodiments, the service status may include that the UE 101 is not compatible with the service, the UE 101 is compatible with the service and the UE 101 includes a prepaid license, the UE 101 is compatible with the service and the UE 101 does not include a prepaid license, the UE 101 has not previously been registered, the UE 101 has previously been registered, a combination thereof, etc.

By way of example, if the UE 101 is compatible with the service and has not yet been registered, the services application 105 may present an activation indicator to the user on a user interface 209. The user interface 209 can include various methods of communication. For example, the user interface 209 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, keyboard, etc. Further, the activation indicator may include a button or other visual feature (e.g., an icon) that may be activated by the user to open an activation or registration wizard. In other embodiments, the user need not activate the icon and the wizard is automatically invoked. Then, the user may fill out convenient forms associated with the wizard to activate/register for the service. Additionally or alternatively, as previously mentioned, the information may be prefilled by the activation wizard by utilizing user information retrieved from the UE 101. This information may then be transmitted to the services platform 111 for activation of the service. Access to the service is then provided to the user.

Figure 3:
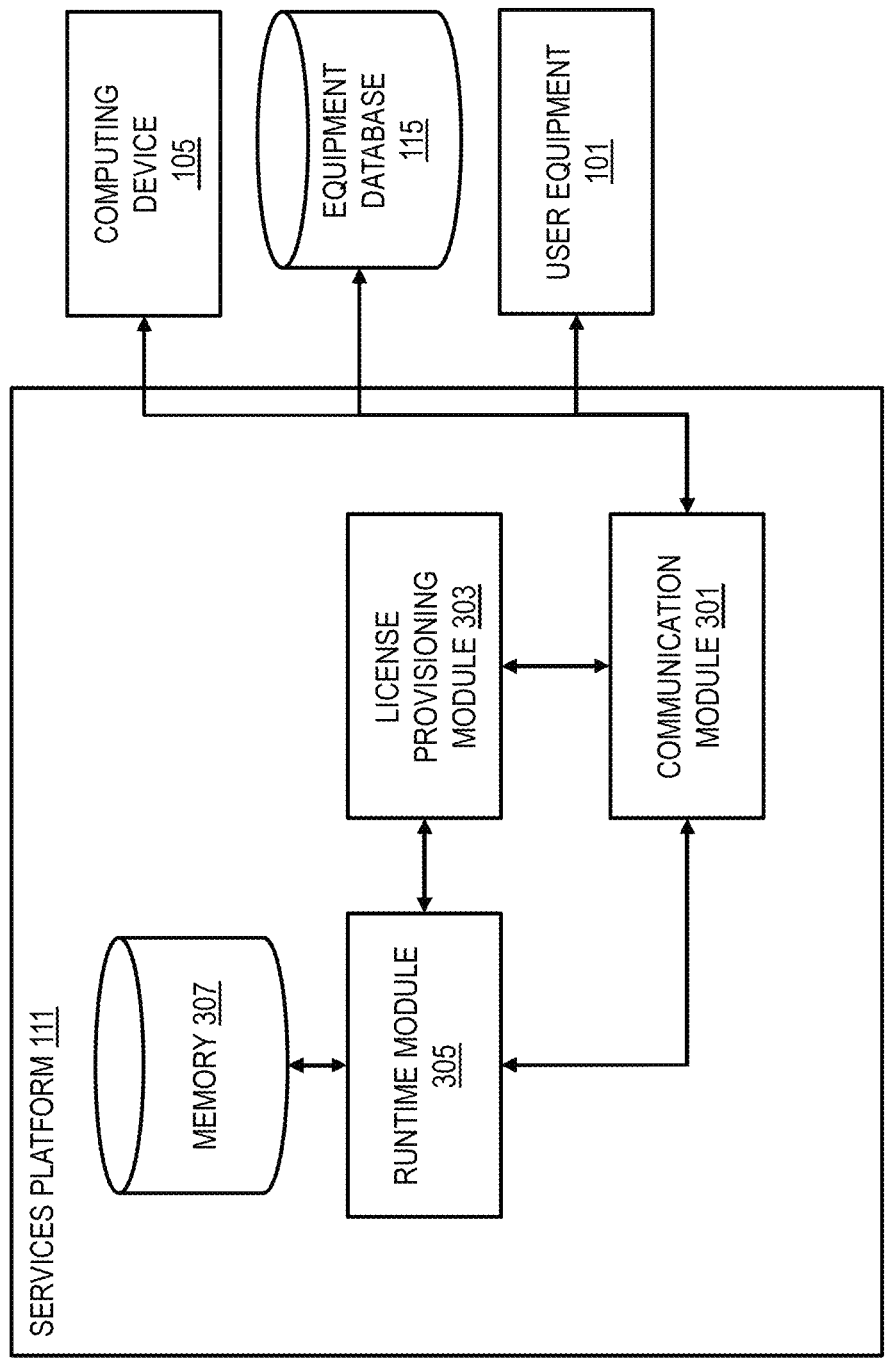
FIG. 3 is a diagram of the components of a services platform, according to one embodiment.

FIG. 3 is a diagram of the components of a services platform, according to one embodiment. By way of example, the services platform 111 includes one or more components for providing a service status to a computing device 103 using a hardware identifier 107 associated with a UE 101. It is contemplated that the functions of these components may be combined in one or more components or performed by other components of equivalent functionality. In this embodiment, the services platform 111 includes at least one communication module 301 for communicating with devices, a licensing provisioning module 303 for associating UEs 101 to a service status, at least one runtime module 305, and at least one memory 307.

The services platform 111 may provide services to UEs 101 and computing devices 103. As noted above, services may include media services (e.g., music services, video services, photo services, etc.), navigation services, gaming services, shopping services, and the like. These services and functions of the services platform 111 may be executed by the runtime module 305 with computer program instructions stored in the memory 307. In some examples, the services platform 111 can send/receive messages to/from the UE 101 and computing device 103 via the communication module 301 to provide the services. The communication module 301 can be used to communicate with the UE 101, the computing device 103, an equipment database 115, and other devices available through a communication network 113. Certain communications can be via methods such as an internet protocol, messaging, or any other communication method (e.g., via the communication network 113). By way of example, the services platform 111 may communicate with a license provisioning gateway or the equipment database 115 to retrieve information associated with a UE 101 based on a hardware identifier 107. Such communications may include, among other data, transfer of information relating to account information, UE 101 information, activation information, or the like.

The services platform 111 may also include a license provisioning module 303 to determine, retrieve, or update a service status associated with data associated with the equipment database 115 and/or the user database. As previously described, the service status may include the UE 101 is not compatible with the service, the UE 101 is compatible with the service and the UE 101 includes a prepaid license, the UE 101 is incompatible with the service or is blacklisted from the service and the UE 101 does not include a prepaid license, the UE 101 has not previously been registered, the UE 101 has previously been registered, a combination thereof, etc. Similarly, the service status may include that the user related status information (e.g., user account information associated with the UE 101). By way of example, the services platform 111 may receive a request for a UE 101 and/or user service status from a computing device 103. The license provisioning module 303 can retrieve information associated with the hardware identifier 107, user information and/or services application 105 related information from the equipment database 115 and/or user database to determine the service status. The equipment database 115 and/or user database can be updated by the services platform 111 as well as other platforms such as other services platforms 111 or a platform associated with a manufacturer of the UE 101. Once the service status is determined, the status may be transmitted to the computing device 103 as a response to the request from the computing device 103.

The license provisioning module 303 may also retrieve additional information about the UE 101 such as licensing information from the equipment database 115 and the blacklist status. The equipment database 115 can include the "blacklist" status of the UE 101. As previously noted, the blacklist status may be a designation as to whether the UE 101 has been listed as not permitted to activate the service for one or more reasons. Exemplary reasons for a UE 101 to be blacklisted include that the UE 101 was reported stolen, complaints about the UE 101 or a user of the UE 101, and/or violations of the terms of use of one or more services. Licensing information can include types of services associated with the UE 101 as well as the type of licenses available (e.g., buy as you go, monthly rental, unlimited use for a period of time, unlimited downloading of content for a period of time and unlimited use of the content on the UE 101, etc.) to the UE 101 and/or license expiration information. The license provisioning module 303 can also determine a country associated with the UE 101 by receiving an identifier (e.g., via a phone number, network identifier, etc.) associated with the UE 101. The country that the UE 101 is associated with could affect the licensing information (e.g., some license types are unavailable in certain countries). Further, the license provisioning module 303 may detect whether a portion of a license associated with the UE 101 has been used (e.g., if an account was activated and then deactivated because the UE 101 was activated by one user and then sold to a new user).

The communication module 301 may also receive requests to register or activate one or more services. The license provisioning module 303 may be utilized to register the UE 101 and/or the user. The license provisioning module 303 may utilize the communication module 301 to update the equipment database 115, user database, and/or another database with account registration information and to associate accounts with hardware identifiers 107 in the equipment database 115. Further the database may be utilized to authenticate users for providing the service at a later time. During the registration process, the services platform 111 may request that the user provide authentication based on more than a hardware identifier 107. In certain scenarios, the authentication may be a personal identification number (PIN) that may be linked to the hardware identifier 107 in the equipment database 115. In other scenarios, the authentication may be another hardware identifier 107 also associated with the UE 101 in the equipment database 115 that may be used as a pair with the hardware identifier 107 for authentication. Additionally or alternatively, the authentication can be based on the user information and/or the services application 105 related information.

Figure 4:
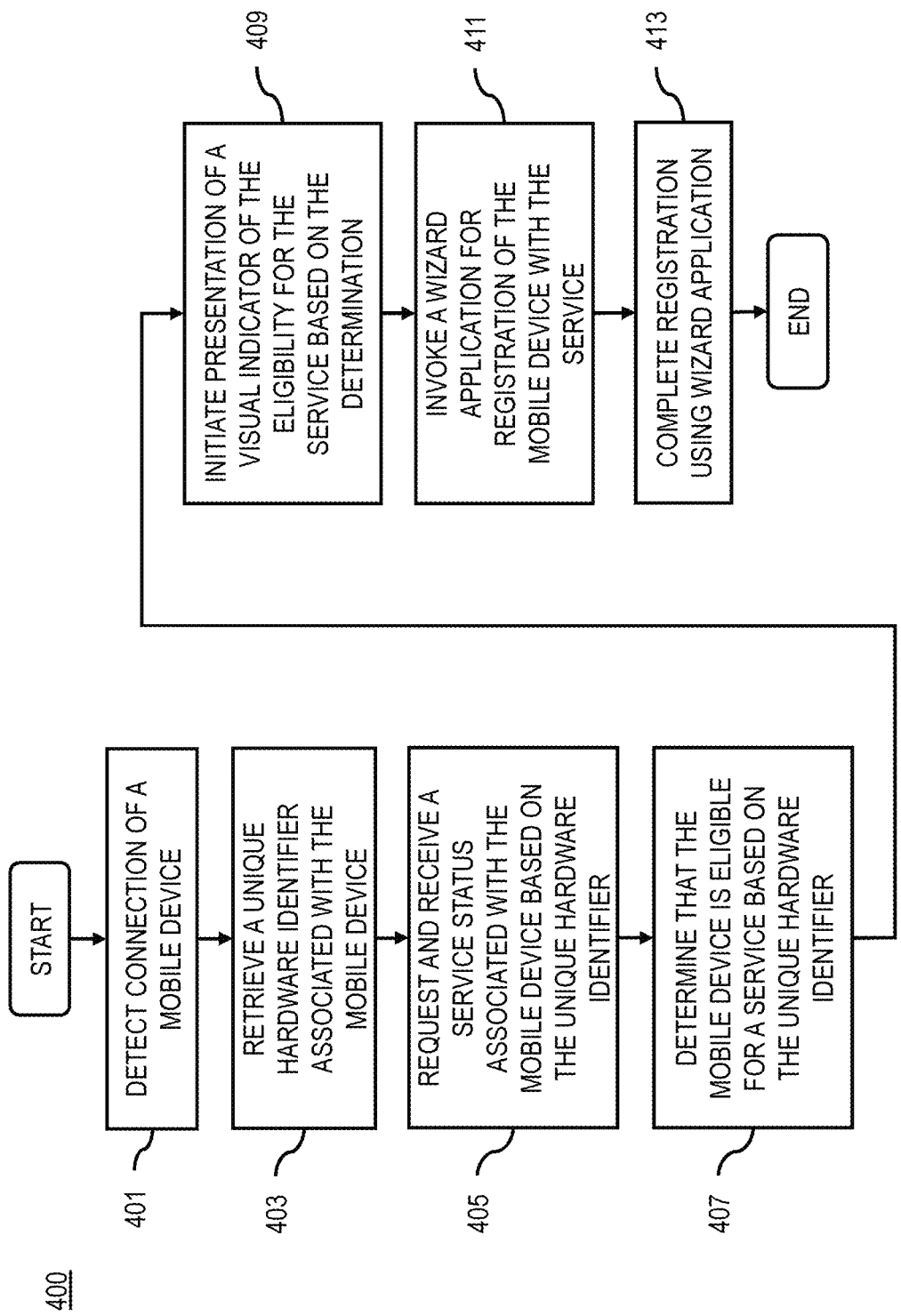
FIG. 4 is a flowchart of a process for presenting an activation menu based on whether a user equipment is eligible for a service, according to one embodiment.

FIG. 4 is a flowchart of a process for presenting an activation menu based on whether a user equipment is eligible for a service, according to one embodiment. In one embodiment, the control logic 201 performs the process 400 and is implemented in, for instance, a chip set including a processor and a memory as shown FIG. 8. A services application 105 may execute on the control logic 201 of a computing device 103. The services application 105 may provide access to services (e.g., music services) of a services platform 111.

In step 401, the control logic 201 detects a connection of a UE 101 (e.g., a mobile device) to the computing device 103. As previously noted, the connection may be wireless or wired. Further, at the time of connection, the control logic 201 may initiate execution of the services application 105. Additionally or alternatively, the services application 105 may be executing when the UE 101 connection is detected. Then, the services application 105 may cause, at least in part, retrieval of a unique hardware identifier 107 (e.g., the IMEI, MEID, etc.) associated with the UE 101 (step 403). The unique hardware identifier 107 may be retrieved by querying the connected UE 101. The query may be at an application level, a request to the operating system of the UE 101, or at a hardware level request for the unique hardware identifier 107. In certain scenarios, a key or authentication may be required to retrieve the unique hardware identifier 107 from the UE 101. This key may be known to the manufacturer of the UE 101 and may be provided to the service provider.

Once the unique hardware identifier 107 is retrieved, the control logic 201 may request and receive a service status of the UE 101 based on the unique hardware identifier 107 from the services platform 111 (step 405). As previously detailed, the service status may include a variety of information regarding the access rights the UE 101 has to the service and whether the access rights have previously been activated or utilized. The control logic 201 may generate a request specifying the unique hardware identifier 107 and a request for the service status. The request may then be caused, at least in part, to be transmitted to the services platform 111. In certain embodiments, the request is only generated if it is predetermined that the UE 101 is compatible with the service. Under certain scenarios, the services application 105 may include a lookup table that matches ranges of UE 101 unique hardware identifiers 107 to a compatibility with the service. This information may be updated using the services platform 111. The control logic 201 may then receive the service status of the UE 101 from the services platform 111.

Then, at step 407, the control logic 201 can determine that the UE 101 is eligible for the service based on the unique hardware identifier 107. In certain embodiments, the eligibility is determined by the service status. In certain embodiments, the UE 101 may be determined to be eligible based on combinations of the service status. For example, the UE 101 may be eligible for activation if the UE 101 is compatible with the service and has not yet been registered. Further, the eligibility may require that the UE 101 is not blacklisted.

Once it is determined that the UE 101 is eligible for the service, the control logic 201 causes, at least in part, presentation of a visual indicator of the eligibility for the service based on the determination (step 409). In certain embodiments, the visual indicator is an activation menu or icon. Moreover, in some embodiments, the visual indicator is only presented if the service status indicates that the UE 101 is compatible with the service and that the service UE 101 has not yet been activated for the UE 101. Additionally, the visual indicator may utilize other properties that may be associated with the service status (e.g., an amount of prepaid service time) to encourage the user to activate the account because the user has already paid for the service.

The visual indicator may be activated to invoke an application (e.g., a wizard) for registering the UE 101 with the service (step 411). Alternatively or additionally, the visual indicator may be the wizard and be automatically activated if it is determined that the UE 101 is eligible. The user may complete the registration process using the wizard application (step 413) as detailed in the user interfaces of FIGS. 6B-6D. Once the registration is complete, the user may utilize the services (e.g., either on the UE 101 or on the computing device 103).

In certain embodiments, the UE 101 may perform the process 400 without connection to another device (e.g., the computing device 103). In this manner, the services application may execute as a UE application 117. When the UE application 117 executes, it may perform the process 400 by first determining or detecting that the UE 101 is a mobile device as described with respect to step 401. Then, the UE application 117 may continue the process 400 (e.g., steps 403 to 413) to present an activation menu or registration wizard for the service on the UE 101. In certain embodiments, the user information and/or the services application 105 related information may be utilized in a similar manner in the process 400 as the unique hardware identifier 107, in addition to the hardware identifier or by itself, to determine whether the UE 101 and/ the user is eligible for a service.

Figure 5:
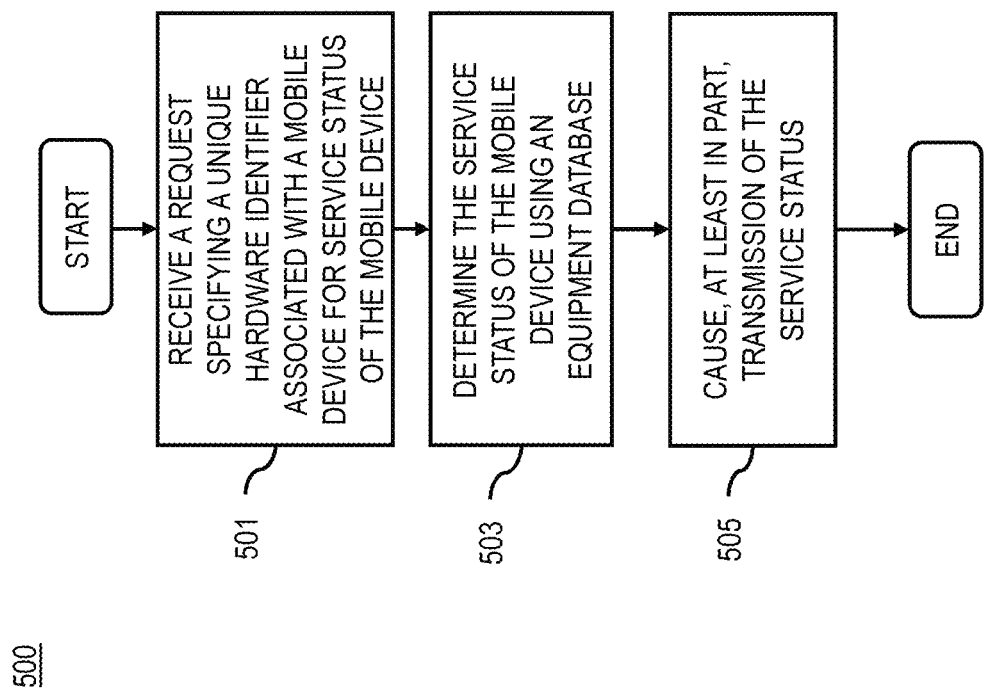
FIG. 5 is a flowchart of a process for determining a service status of a user equipment, according to one embodiment.

FIG. 5 is a flowchart of a process for determining a service status of a user equipment, according to one embodiment. In one embodiment, the runtime module 305 of a services platform 111 performs the process 500 and is implemented in, for instance, a chip set including a processor and a memory as shown FIG. 8. In step 501, the runtime module 305 receives a request specifying a unique hardware identifier associated with a UE 101 for a service status of the UE 101. This request may be received from a computing device 103 connected to the UE 101. In certain embodiments, the runtime module 305 may authenticate with the computing device 103 to ensure that the computing device 103 is executing an application that is licensed to utilize the services platform 111.

Then, the runtime module 305 determines the service status of the UE 101 using an equipment database 115. As noted previously, the equipment database 115 may include information (e.g., licenses associated with the UE 101, activation status, account information, etc.) about the UE 101 based on the hardware identifier 107. In certain embodiments, the service status is the retrieved information from the equipment database 115. In other scenarios, the service status may be determined by processing raw data into other values in a format that may be readily usable by a services application 105 on the computing device 103. In one example, the runtime module 305 may receive raw values that the UE 101 is associated with a music service, is prepaid for 6 months, and has not yet been activated. This information may be converted to a service status indicating that the UE 101 is eligible for the service. Then, the runtime module 305 causes, at least in part, transmission of the service status to the computing device 103. In certain embodiments, the user information and/or the services application 105 related information may be utilized in a similar manner as in the process 500 as the unique hardware identifier 107, in addition to the hardware identifier or by itself, for determining the service status of the user equipment and/ the user.

Figure 6A:
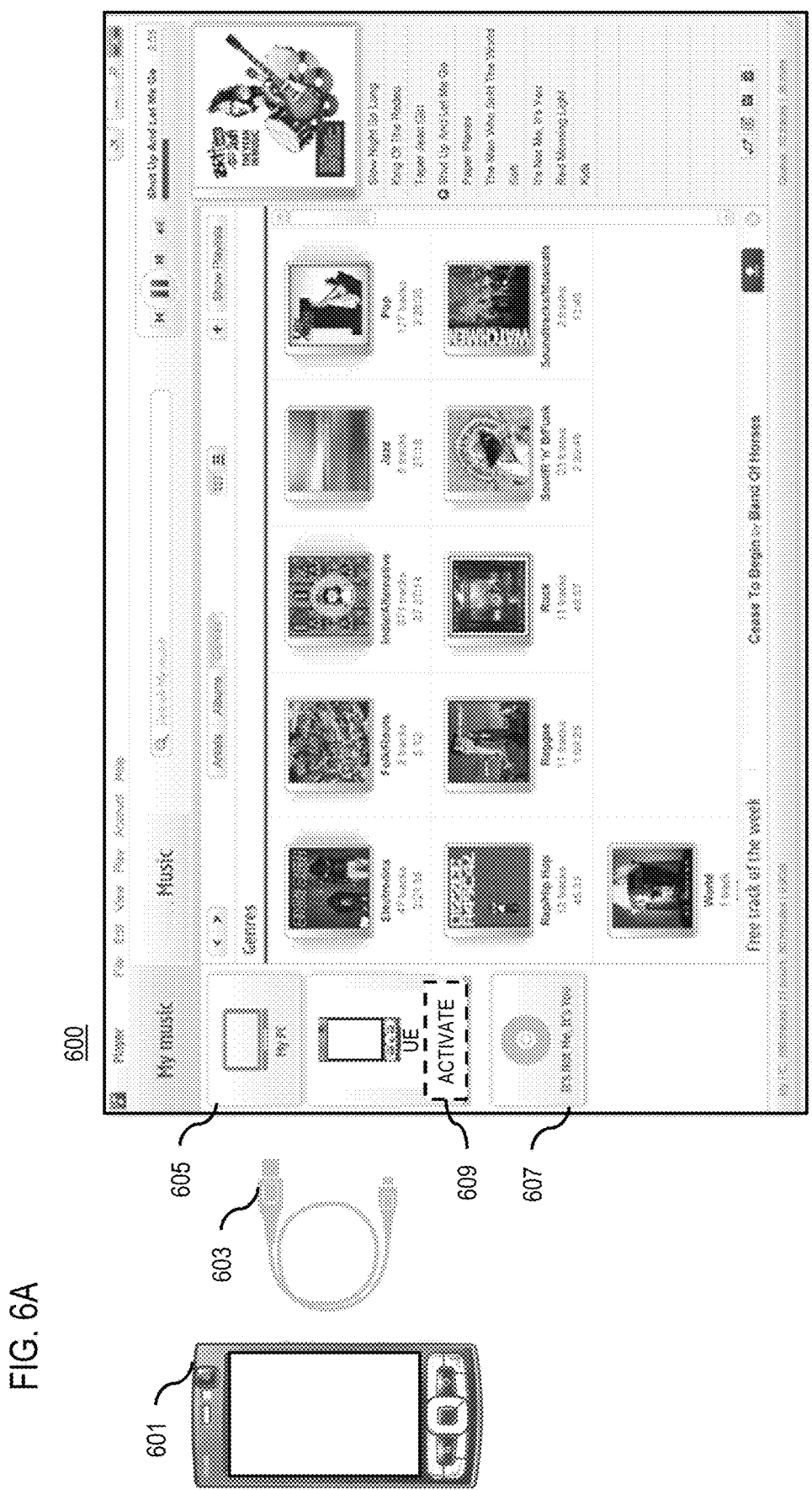
Figure 6B:
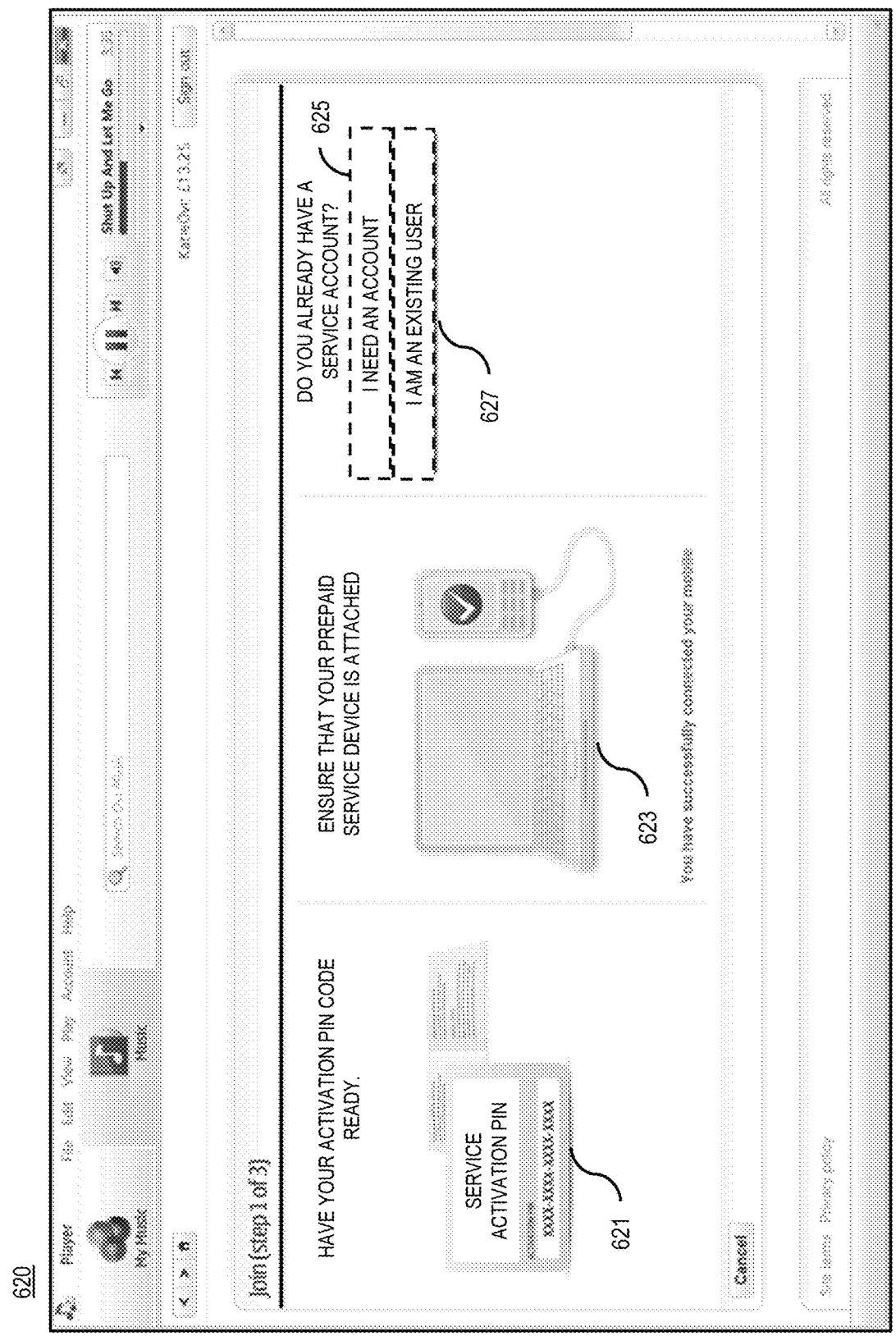

FIGS. 6A-6E are diagrams of user interfaces, e.g. dialogue screens, utilized in the processes of FIG. 4, according to various embodiments. FIG. 6A shows a user interface 600 of a computing device 103 that may be connected to a UE 601 via a connection interface 603. The user interface 600 may execute a services application (e.g., a music application). As shown, the music application may be executing when the UE 601 is attached. The music application has a panel associated with devices associated with the computing device 103 including an icon or visual identifier or indicator associated with each device (e.g., a computing device identifier 605, a media device identifier 607, and a UE identifier 609. The UE identifier 609 includes various options for being utilized. In one example, the processes of FIG. 4 are utilized and it is determined that the UE 101 is eligible for a service. The UE identifier 609, as shown, displays an option to activate the service. In certain embodiments, the UE identifier 609 only shows the activation option if the UE 601 has access to the service and is not yet activated. Additionally, the UE identifier 609 may also indicate that the service has been prepaid and/or a value associated with the amount that has been prepaid to encourage the user to activate the service. In certain embodiments, access to the service is prepaid as a package when the user buys the UE 601.

If the user decides to activate access to the service, the user may be presented with a registration wizard that may be displayed via a graphical user interface. A first step in the registration process is shown in the user interface 620 of FIG. 6B. The step includes providing instructions on what is needed for activation 621, 623. Moreover, the step includes an option for the user to select a registration option of creating a new account 625 or associating the UE 601 to an already existing account 627. In certain embodiments, the computing device 103 may automatically detect that the UE 601 is associated with an existing user account with the services platform 111 by querying the UE 601. By way of example, the existing user account may be associated with a suite or set or related services that share login credentials. In another embodiment, the user account may be unrelated to the service being activated. An existing user may tie the UE 601 to the account by logging in and/or authenticating, while other users may activate the service for the UE 601 by entering registration information. If detected, the username of the existing user may be prefilled by the computing device 103. In certain scenarios, an existing user may additionally be allowed to create a new account for the UE 601. The existing user information associated with the current login account may be automatically filled in the registration screens to assist the user. In certain scenarios, the account is specific to the music service. In other scenarios, the account may be global to many services of associated services platforms. For example, the account may be tied to an e-mail account, a music service, social services, etc.

Then, a second step is presented in the user interface 640 of FIG. 6C. The step includes entering a security identifier, e.g. a security PIN 641 or other security identifier that may be associated with the UE 601 to register the UE 601. In certain scenarios, the registration process need not use a PIN. In other scenarios, the security identifier may be automatically identified as a hardware identifier associated with the UE 601, and/or as an identifier, such as the user information and/or the services application 105 related information, that the user has stored the UE 601. Moreover, the user may be asked to verify some information, such as the country of residence 643 (e.g., for licensing purposes and copyright laws associated with the country), and agree to terms and conditions of the service 645.

Figure 6D:
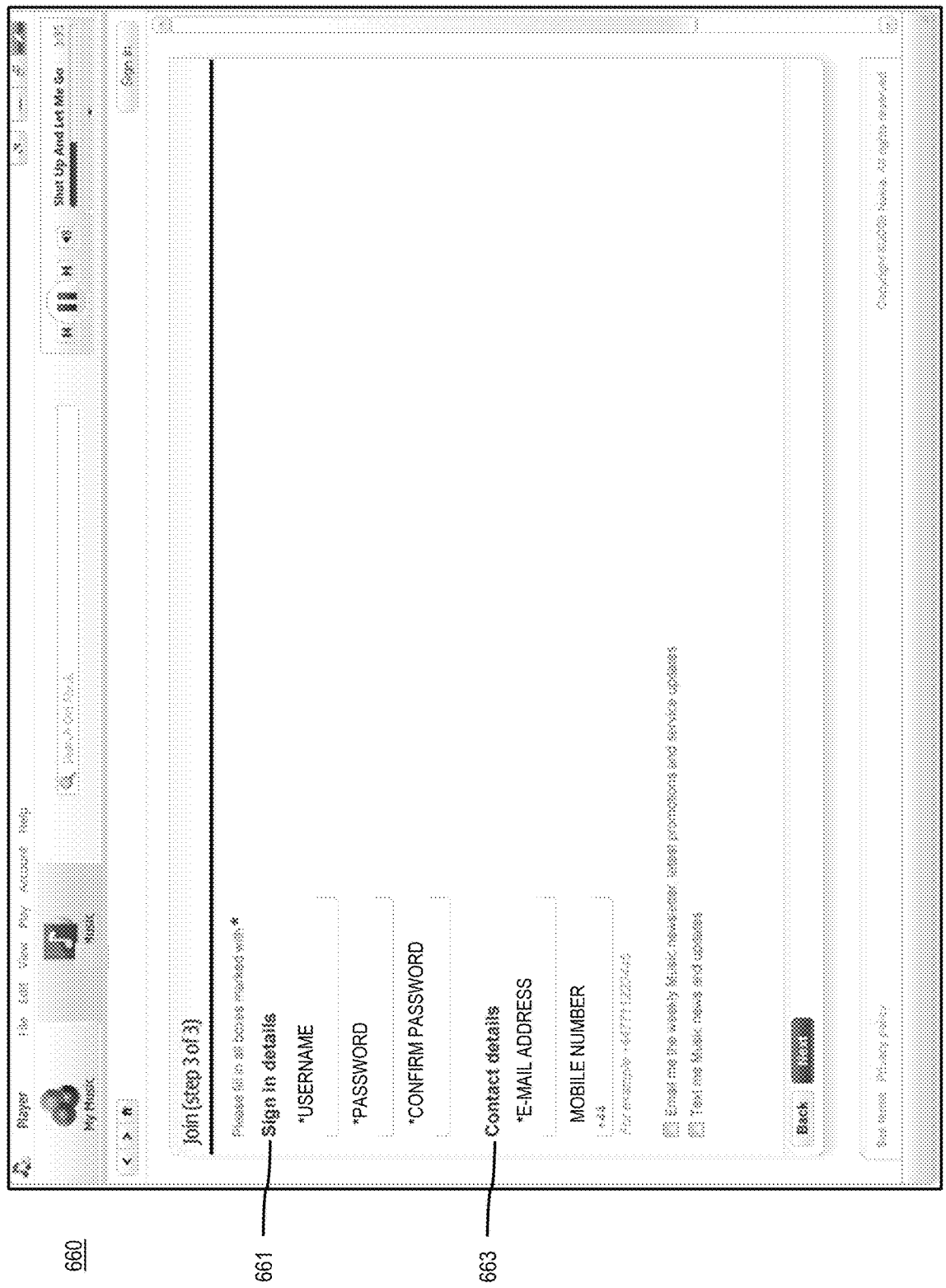

FIG. 6D presents a user interface 660 displaying a third step of the registration process. This step includes a request for authentication details 661 for future access. Moreover, the step includes a request for contact details 663 (e.g., an e-mail address, mobile phone number, naming the UE 601, etc.). Further, the user interface 660 allows the user to register for additional services (e.g., an e-mail news letter) associated with the service. Moreover, a promotional screen (not shown) with associated services may additionally be prompted to the user. As described above, in certain scenarios, one or more of the sign in details and/or contact details may be prefilled based on account information stored on the UE 101.

Figure 6E:
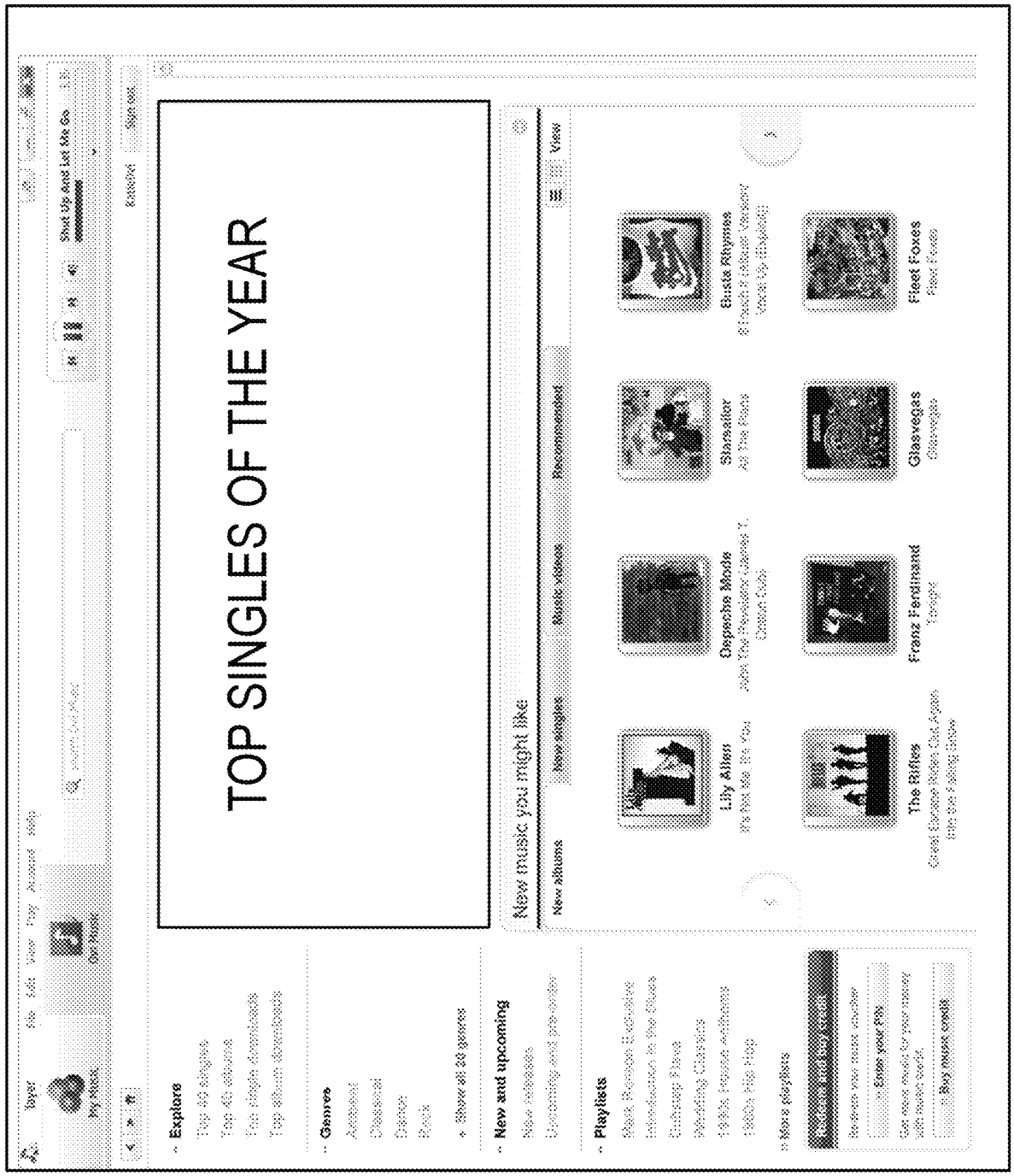

Once registration is completed, the user may begin using the music service (e.g., as shown in user interface 680 of FIG. 6E). As such, the user may be able to immediately begin downloading music to the computing device 103 or the UE 601. In certain embodiments, the activation allows the user to access the music based on a license. For example, the license may only allow the UE 601 to access the content. Alternatively or additionally, a license may allow the UE 601 and the computing device 103 to access the content. Moreover, in certain embodiments, the license may be tied to the computing device 103.

The above approach, according to certain embodiments, allows for the notification and activation of a service for a user of a UE 101 in a convenient format. Additionally, user may be informed that the user has already purchased access to the service and only activation is needed to utilize the service. Moreover, this may be used to encourage users into completing the activation procedures. Additionally, in certain embodiments, the computing device 103 only displays an activation menu or activation wizard based on the eligibility of the UE 101. In this manner, the approach saves user time and processor time by filtering unneeded activation from being displayed to a user. Additionally, in certain embodiments, the UE 101 and the computing device 103 can be a same device.

The processes described herein for presenting an activation indicator to a user based on a hardware identifier may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
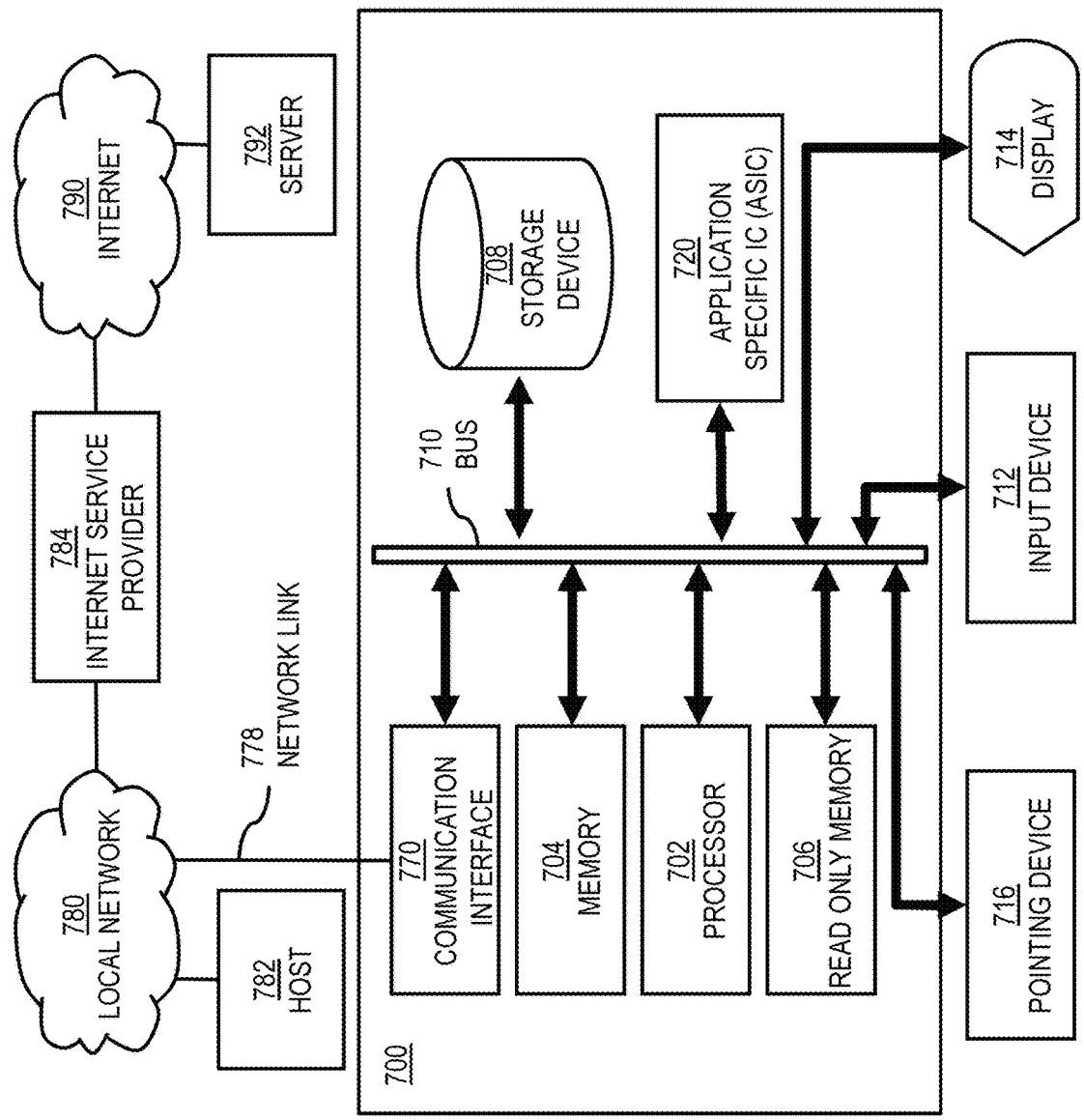
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to present an activation indicator to a user based on a hardware identifier as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of presenting an activation indicator to a user based on a hardware identifier.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to presenting an activation indicator to a user based on a hardware identifier. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for presenting an activation indicator to a user based on a hardware identifier. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for presenting an activation indicator to a user based on a hardware identifier, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for the UE 101.

The term "computer-readable medium" as used herein to refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
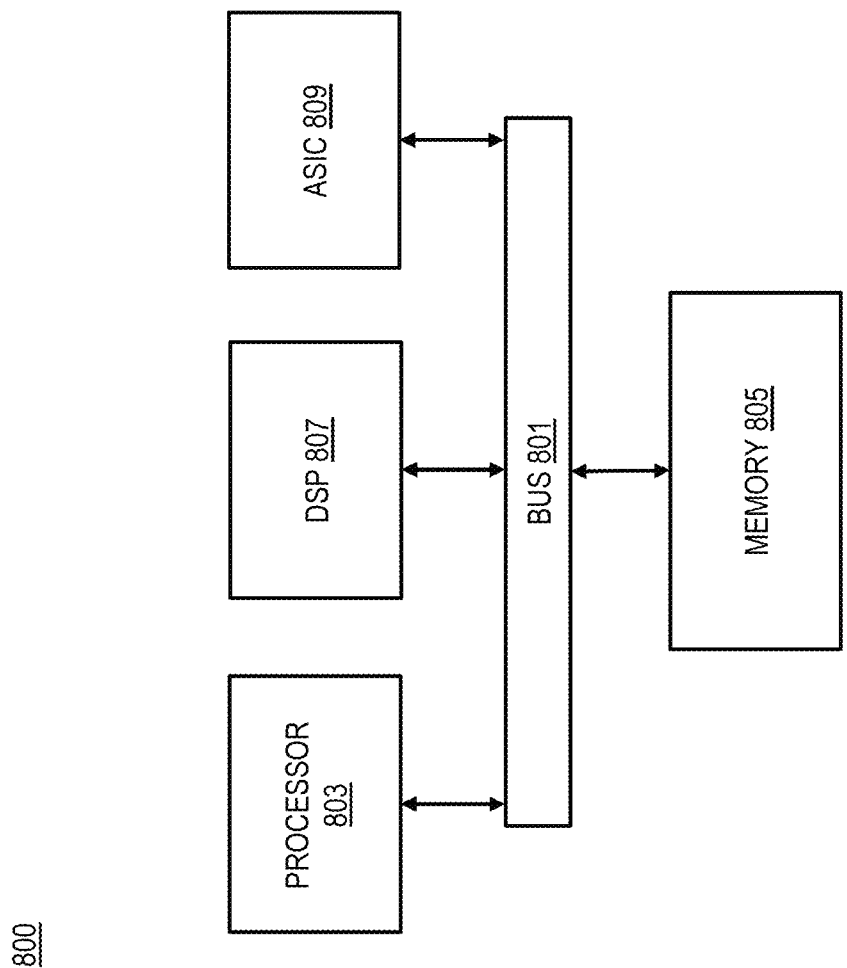
FIG. 8 is a diagram of a chip set that can be used to implement an embodiment of the invention.

FIG. 8 illustrates a chip set 800 upon which an embodiment of the invention may be implemented. Chip set 800 is programmed to present an activation indicator to a user based on a hardware identifier as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of presenting an activation indicator to a user based on a hardware identifier.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to present an activation indicator to a user based on a hardware identifier. The memory 805 also stores the data associated with or generated by the execution of the inventive steps.

Figure 9:
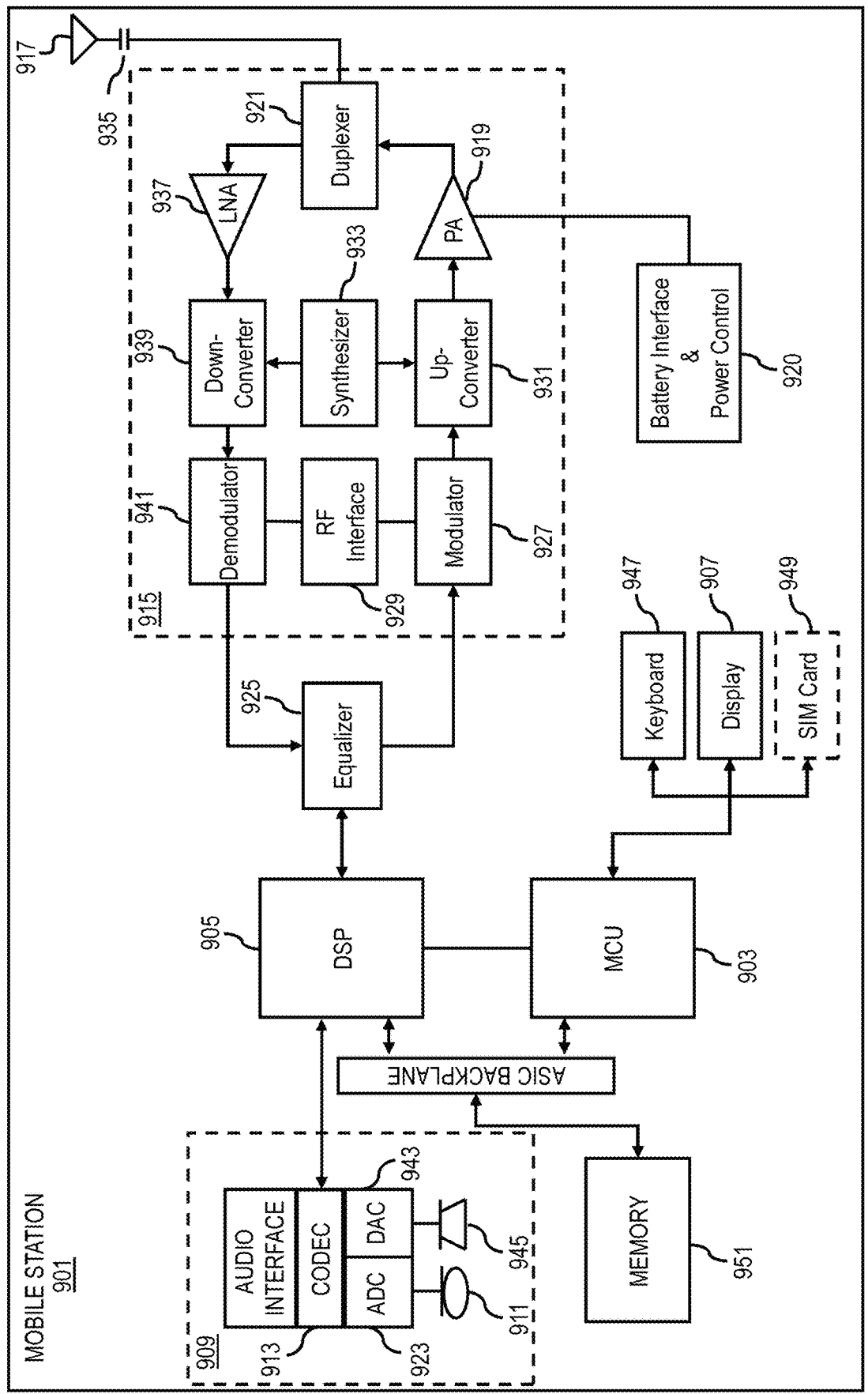
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of initiating transmission of a hardware identifier. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of initiating transmission of a hardware identifier. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to initiate transmission of a hardware identifier. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   detecting, by an apparatus, a connection with a user equipment via a short-range wireless network interface of the apparatus;
   causing, at least in part, by the apparatus, retrieval of at least one unique hardware identifier associated with the user equipment over a short-range wireless network;
   causing, by the apparatus, a determination whether the user equipment is eligible for a service based at least on the at least one unique hardware identifier; and
   initiating, at least in part, by the apparatus, at least one of a creation of an account for the service or an access to an existing account of the service if the user equipment is eligible.

2. The method of claim 1, wherein the determination is initiated if the user equipment is compatible with the service.

3. The method of claim 2, further comprising:
   determining the user equipment is compatible with the service based, at least in part, on registration information, licensing information, or a combination thereof associated with the user equipment.

4. The method of claim 3, wherein the registration information comprises a status of the registration of the user equipment to activate the service.

5. The method of claim 3, wherein the licensing information comprises a status of a license of the user equipment to utilize the service, and wherein the license comprises a pre-paid license.

6. The method of claim 5, wherein the status of the license comprises a type of service access provided to the user equipment, a duration of the access, license expiration information, or a combination thereof.

7. The method of claim 1, wherein the unique hardware identifier comprises at least one of an international mobile equipment identity (IMEI), an electronic serial number, a mobile equipment identity (MEID), user inaccessible identifiers, or a combination thereof.

8. The method of claim 1, wherein the user equipment is a mobile communication device.

9. The method of claim 1, wherein the short-range wireless network is wireless local area network, Bluetooth® network, or ultra-wide band network.

10. The method of claim 1, wherein the service is a media service, a shopping service, a navigation service or a gaming service.

11. An apparatus comprising:
    at least one processor; and
    at least one memory including computer program code for one or more programs,
    the at least one memory and the computer program code configured to, with the at least one processor, cause the apparatus to perform at least the following,
       detect, by an apparatus, a connection with a user equipment via a short-range wireless network interface of the apparatus;
       cause, at least in part, by the apparatus, retrieval of at least one unique hardware identifier associated with the user equipment over a short-range wireless network;
       cause, by the apparatus, a determination whether the user equipment is eligible for a service based at least on the at least one unique hardware identifier; and
       initiate, at least in part, by the apparatus, at least one of a creation of an account for the service or an access to an existing account of the service if the user equipment is eligible.

12. The apparatus of claim 11, wherein the determination is initiated if the user equipment is compatible with the service.

13. The apparatus of claim 12, wherein the apparatus is further caused to:
    determine the user equipment is compatible with the service based, at least in part, on registration information, licensing information, or a combination thereof associated with the user equipment.

14. The apparatus of claim 13, wherein the registration information comprises a status of the registration of the user equipment to activate the service.

15. The apparatus of claim 13, wherein the licensing information comprises a status of a license of the user equipment to utilize the service, and wherein the license comprises a pre-paid license.

16. The apparatus of claim 15, wherein the status of the license comprises a type of service access provided to the user equipment, a duration of the access, license expiration information, or a combination thereof.

17. The apparatus of claim 11, wherein the unique hardware identifier comprises at least one of an international mobile equipment identity (IMEI), an electronic serial number, a mobile equipment identity (MEID), user inaccessible identifiers, or a combination thereof.

18. A non-transitory computer-readable storage medium carrying one or more sequences of one or more instructions which, when executed by one or more processors, cause an apparatus to at least perform the following steps:
    detecting, by an apparatus, a connection with a user equipment via a short-range wireless network interface of the apparatus;
    causing, at least in part, by the apparatus, retrieval of at least one unique hardware identifier associated with the user equipment over a short-range wireless network;
    causing, by the apparatus, a determination whether the user equipment is eligible for a service based at least on the at least one unique hardware identifier; and
    initiating, at least in part, by the apparatus, at least one of a creation of an account for the service or an access to an existing account of the service if the user equipment is eligible.

19. The non-transitory computer-readable storage medium of claim 18, wherein the determination is initiated if the user equipment is compatible with the service.

20. The non-transitory computer-readable storage medium of claim 19, wherein the apparatus is further caused to perform:
    determining the user equipment is compatible with the service based, at least in part, on registration information, licensing information, or a combination thereof associated with the user equipment.

* * * * *